US006805235B2

(12) United States Patent
Tulkki

(10) Patent No.: US 6,805,235 B2
(45) Date of Patent: Oct. 19, 2004

(54) DEVICE FOR CONTINUOUSLY OPERATED BELT SINTERING

(75) Inventor: Olavi Tulkki, Tornio (FI)

(73) Assignee: Outokumpu Oyj, Espoo (FI)

( * ) Notice: Subject to any disclaimer, the term of this patent is extended or adjusted under 35 U.S.C. 154(b) by 0 days.

(21) Appl. No.: 10/432,055

(22) PCT Filed: Nov. 16, 2001

(86) PCT No.: PCT/FI01/00994

§ 371 (c)(1), (2), (4) Date: Oct. 22, 2003

(87) PCT Pub. No.: WO02/40933

PCT Pub. Date: May 23, 2002

(65) Prior Publication Data

US 2004/0074740 A1 Apr. 22, 2004

(30) Foreign Application Priority Data

Nov. 17, 2000 (FI) ........................................... 20002524

(51) Int. Cl.$^{7}$ ............................................... B65G 39/16
(52) U.S. Cl. ...................................................... 198/807
(58) Field of Search ................................ 198/806, 807, 198/810.03, 832

(56) References Cited

U.S. PATENT DOCUMENTS 3,159,268 A * 12/1964 Dyke ......................... 198/807
3,193,086 A * 7/1965 Wilhelm ..................... 198/807
3,362,686 A 1/1968 MacKay
4,608,008 A 8/1986 Hehl
4,693,363 A * 9/1987 Kuehnert .................... 198/807
4,792,037 A 12/1988 Huber

FOREIGN PATENT DOCUMENTS

DE 29903942 8/1999
WO WO9900317 1/1999

* cited by examiner

*Primary Examiner*—James R. Bidwell
(74) *Attorney, Agent, or Firm*—Morgan & Finnegan, L.L.P.

(57) ABSTRACT

The invention relates to a device for moving the belt of a belt conveyor used in continuously operated belt sintering between the drawing drum and the folding drum, and for aligning the belt sintering belt to be moved by the belt conveyor with respect to the sintering device. According to the invention, in order to rotate the drawing drum (2) of the belt conveyor used in belt sintering, in the immediate vicinity of the other end of the drawing drum, there is installed an actuator device (5, 6, 8) of the belt conveyor, where in at least one rotary element (5) that is installed co-centrically with the axis (15) of the drawing drum and cogged on the outer circumference, there is connected at least one actuator element (6) that is essentially smaller in diameter and cogged on the outer circumference, which actuator element (6) can be made to rotate by means of an actuating motor (8) belonging to the actuator device. Moreover, in order to align the belt (1) of the belt conveyor with respect to the sintering device (4), the actuator device of the belt conveyor is installed, with respect to the belt conveyor, so that the aligning of the belt (1) of the belt conveyor can, when necessary, be carried out essentially by moving the whole actuator device (5, 6, 8) of the belt conveyor.

5 Claims, 2 Drawing Sheets

DEVICE FOR CONTINUOUSLY OPERATED BELT SINTERING

Figure 1:
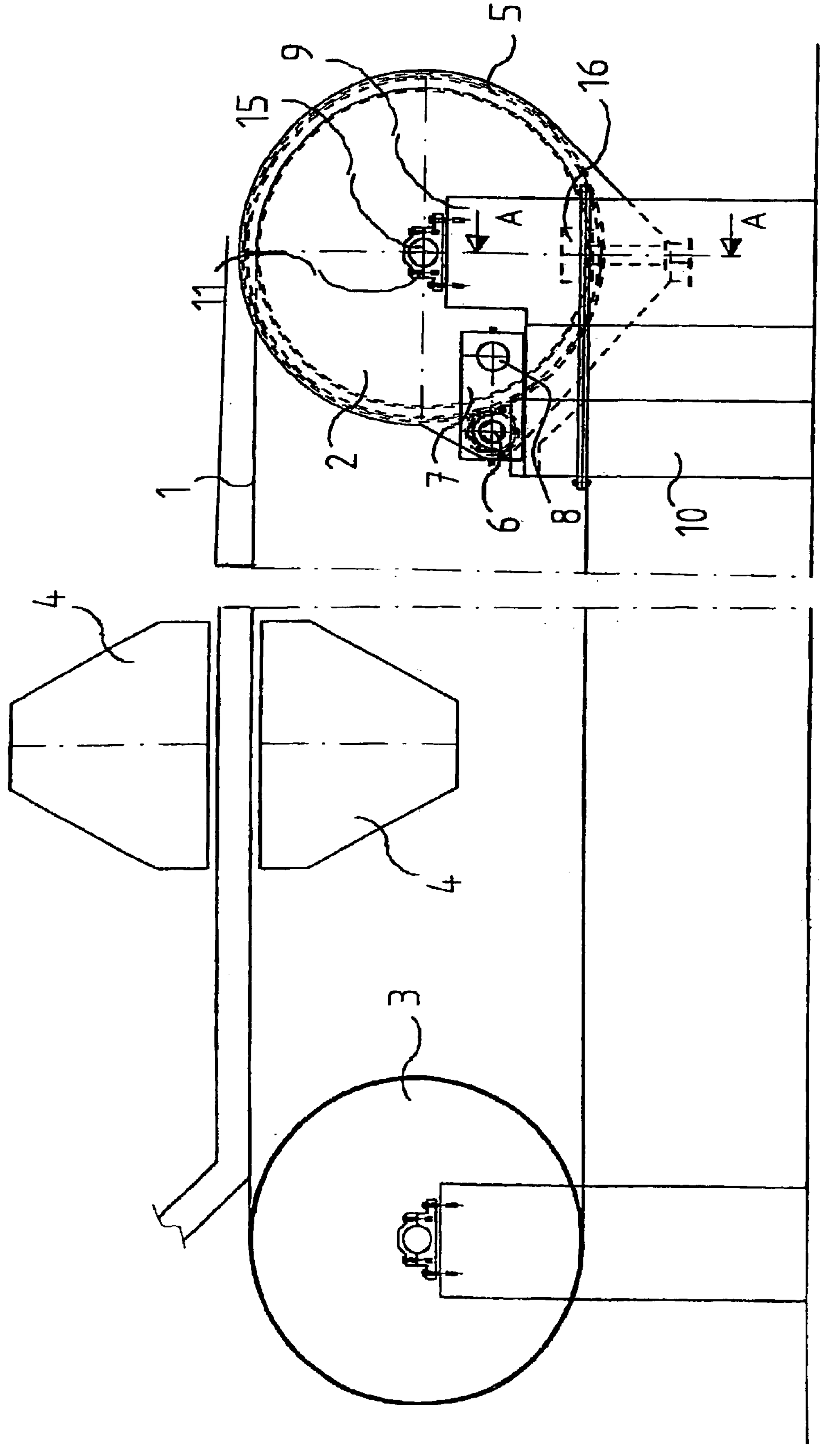

The present invention relates to a device for moving the belt of a belt conveyor used in continuously operated belt sintering and for aligning the sintering belt conveyed on the belt conveyor with respect to the sintering device.

In sintering, the material to be sintered is heated up to a high temperature, where the originally soft material that is difficult to treat is, by means of chemical forces, transformed to an essentially hard material that is easier to treat. When manufacturing for instance ferroalloys, the finely divided dried concentrate to be processed is first transformed, in the presence of a bonding agent and for instance in a pelletizing drum, into essentially soft, spherical pellets. In order to be able to feed the pellets to the melting phase according to the manufacturing process of ferroalloys, the essentially soft, spherical pellets are nowadays usually sintered by means of belt sintering. In belt sintering, on the conveyor belt conveyed by the belt conveyor, the essentially soft pellets are distributed as an essentially continuous material bed. Said material bed is, while the conveyor belt moves, first subjected to a preheating step, then to a sintering step proper, and further to a cooling step, whereafter the material bed composed of essentially soft pellets has turned into a bed of essentially hard pellets to be fed into a smelting furnace.

During the various steps connected to sintering, through the conveyor belt there is conveyed, depending on the sintering step at hand, gases at different temperatures, wherefore the belt of the conveyor is under a high stress while the temperatures of the gases fed in vary between 200 and 1300° C. Now the belt of the conveyor may stretch differently at different spots, and this affects how the belt is maintained at the desired position with respect to the walls of the sintering furnace. Moreover, in order to achieve an advantageous sintering result, it is necessary that the belt of the conveyor can be made to move in an essentially smooth and slow manner throughout the whole sintering process, irrespective of any changes caused in the belt. Consequently, an essentially accurate operation is required of the conveyor belt and its actuator device in belt sintering. However, a drawback with current conveyor belts meant for belt sintering is a jerky motion of the conveyor belt, which jerky motion is caused by dead strokes between the long axis and the multiple-stage gear while rotating a large-size drawing drum at a low speed from the drawing drum axis. A jerky motion in the conveyor belt in turn results in a wobbly motion of the structures of the sintering furnace, which is a strain particularly to the sintering furnace linings and thus shortens the working life of the equipment and reduces the operational security of said equipment.

The object of the present invention is to eliminate some of the drawbacks of the prior art and to realize an improved device that is more secure in operation, for moving a belt conveyor used in a continuously operated belt sintering furnace and for aligning the belt of the conveyor so that the working age of the belt conveyor and the belt can be extended. The essential novel features of the invention are apparent from the appended claims.

The device according to the invention is meant to be used in a belt conveyor that is employed for sintering a material bed, created on the belt of a belt conveyor, of pellets made of a finely divided, metal bearing or metal alloy bearing material in a continuously operated sintering furnace, where through the belt of the belt conveyor there are conducted hot gases in order to sinter the material bed while the material bed moves through the various sintering steps along the conveyor belt. According to the invention, in order to move the conveyor belt in an essentially smooth fashion and at the speed required in sintering, and in order to align the conveyor belt with respect to the sintering device, the actuator device of the belt conveyor, connected to the drawing drum of the belt conveyor and installed in the immediate vicinity of the other end of the drawing drum, is arranged, with respect to the belt conveyor, so that the aligning of the belt of the conveyor can, when necessary, be carried out in an essentially easy and simple way, essentially by moving the whole actuator device at the same time.

According to the invention, the actuator device of a belt conveyor meant for sintering pellets made of some metal bearing or metal alloy bearing material includes at least one rotary element, i.e. cogged wheel, that is co-centric with the drawing drum of the belt conveyor and has a diameter that is essentially equal to the diameter of the drawing drum, said cogged wheel being advantageously attached to the drawing drum of the belt conveyor, advantageously at that end of the drum, in the vicinity whereof the whole actuator device of the belt conveyor is installed. The cogged wheel can also be installed so that the cogged wheel is arranged on the same axis with the drawing drum of the belt conveyor, but is separate from the drawing drum of the belt conveyor. Further, the cogged wheel is installed to be in contact with at least one actuator element, actuator wheel, the diameter whereof is essentially smaller than that of the cogged wheel, so that the cogged wheel and the actuator wheel together form a gear wheel drive that is rotated by means of an actuator motor connected to the actuator wheel. Thus the number of cogged wheels in the device according to the invention is the same as the number of actuator wheels. A cogged wheel can be rotated around its axis at a desired speed by means of an actuator wheel with an essentially smaller diameter. Owing to the essentially small actuator wheel, the transmission ratio in the actuator device can be reduced, in which case the dead strokes caused by the transmission gear remain slight. Thus also the jerky motion of the belt conveyor can be essentially reduced.

In order to advantageously align the belt used in sintering with respect to the sintering device, at least the support of that end of the axis of the drawing drum of the belt conveyor that is located nearest to the actuator device and the actuator device of the drawing drum are according to the invention installed on one and the same foundation, so that when aligning the belt by moving the drawing drum, the whole actuator device is moved along. Consequently the moving of the cogged gears, i.e. the cogged wheel and the actuator wheel contained in the actuator device, with respect to each other need not be carried out while adjusting the position of the drawing drum when aligning the belt of the belt conveyor. The aligning of the belt used for sintering is carried out when necessary, in case transformations caused by heat or by some other factor have taken place in the belt.

When the device according to the invention is in operation, an actuator motor rotates the actuator wheel, which is, by intermediation of the cogging provided on its outer circumference, in contact with the cogged wheel with an essentially larger diameter that is connected co-centrically to the drawing drum. When rotating, the actuator wheel further rotates the cogged wheel by using the cogging provided on the outer circumference of the cogged wheel. Owing to the essentially large difference between the diameters of the cogged wheel and the actuator wheel, the cogged wheel with the large diameter is made to rotate, by the actuator wheel with the small diameter, at an essentially slow speed and consequently also in a smooth fashion. The cogged wheel further rotates a drawing drum that is installed co-centrically on the same axis, so that the conveyor belt placed on the drawing drum circumference and used for sintering is also made to move at an advantageously slow and an essentially even speed, with respect to the requirements of the sintering process.

Figure 2:
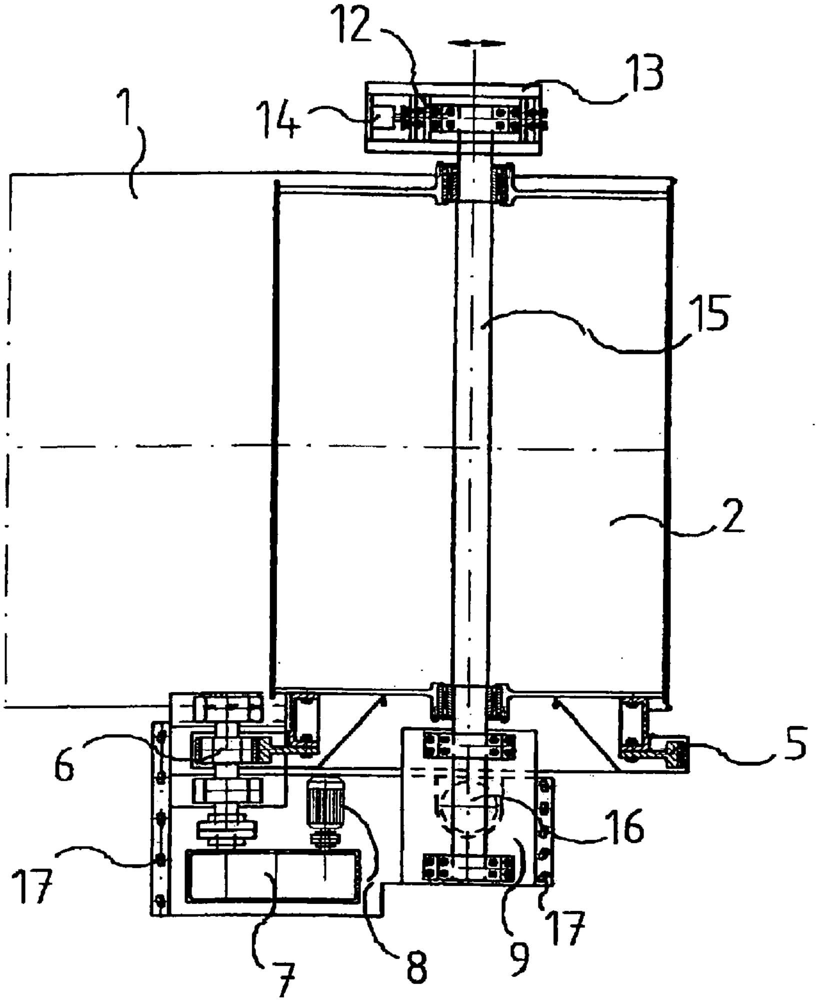
Figure 3:
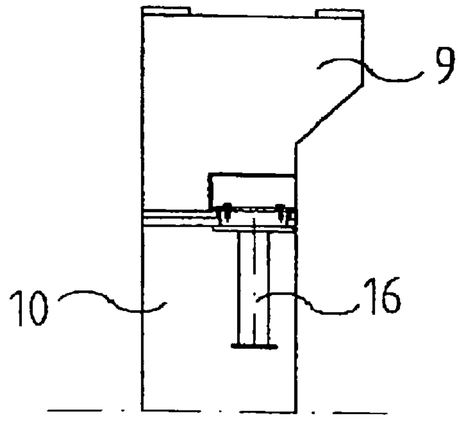

The invention is explained in more detail below, with reference to the appended drawings, where FIG. 1 illustrates a preferred embodiment of the invention, seen from the side, FIG. 2 is a top-view illustration of an embodiment according to FIG. 1, located in the immediate vicinity of the drawing drum of the belt conveyor, and FIG. 3 illustrates the embodiment according to FIG. 1, seen in the direction A—A.

According to the drawings, the belt 1 of the belt conveyor is movably installed around the drawing drum 2 and the folding drum 3, so that the moving belt 1 passes through the sintering device 4. At the other end of the drawing drum 2, there is mechanically attached a cogged wheel 5 that has a larger diameter than the drawing drum 2 and is provided with cogging on the outer circumference. The cogged wheel 5 is rotated by means of an actuator wheel 6 that is in mechanical contact with the cogging of the cogged wheel 5 and is likewise provided with a cogging on the outer circumference, but has an essentially smaller diameter than the cogged wheel 5. The actuator wheel 6 is, by intermediation of the axis thereof, connected further, by means of a gear drive 7, to the actuating motor 8, which rotates the actuator wheel 6. The actuator wheel 6 and the actuating motor 8 are supported against the same foundation 9 that is installed movably with respect to the support structures 10 of the belt conveyor. The foundation 9 also includes means 17 for permanently fixing the foundation 9 with respect to the support structures. 10. On the foundation 9, there also is attached the support structure 11 of the axis formed at the end of the drawing drum 2 that is in connection with the actuator device.

The supporting element 12 of that end of the axis of the drawing drum 2 that is opposite to the actuator element is arranged on a separate foundation 13. The supporting element 12 is provided with at least one moving element 14, whereby the position of the axis of the drawing drum 2 can be adjusted, when the drawing drum 2 is realigned.

When realigning the drawing drum 2, the foundation 9, against which there are supported both the actuator wheel 6 of the drawing drum, the actuating motor 8 and that end of the axis 15 of the drawing drum 2 that falls on the side of the actuator device, are moved to the desired position, advantageously around the support element 16 of the foundation 9. Simultaneously, by means of the moving element 14 attached to the support element 12 of that end of the axis of the drawing drum that is opposite to the actuator device, the axis of the drawing drum 2 is shifted to the desired position also at the other end.

What is claimed is:

1. A device for moving the belt of a belt conveyor used in continuously operated belt sintering between the drawing drum and the folding drum, and for aligning the belt sintering belt to be moved by the belt conveyor with respect to the sintering device, comprising an actuator device of the belt conveyer for rotating the drawing drum of the belt conveyor used in belt sintering, installed in the immediate vicinity of the other end of the drawing drum, at least one actuator element of the actuator device being connected to at least one rotary element that is installed co-centrically with the axis of the drawing drum and cogged on the outer circumference, at least one actuator element being essentially smaller in diameter and cogged on the outer circumference, which actuator element can be made to rotate by means of an actuating motor belonging to the actuator device, and that in order to align the belt of the belt conveyor with respect to the sintering device, the actuator device of the belt conveyor is installed, with respect to the belt conveyor, so that the aligning of the belt of the belt conveyor can, when necessary, be carried out essentially by moving the whole actuator device of the belt conveyor and that at least the support of that end of the axis of the drawing drum that falls nearest to the actuator device and the actuator device of the drawing drum are installed on the same foundation.

2. A device according to claim 1, wherein the cogged rotary element meant for rotating the drawing drum is attached at the end of the drawing drum.

3. A device according to claim 1, the cogged rotary element meant for rotating the drawing drum is installed on the axis of the drawing drum.

4. A device according to claim 1, wherein the diameter of the rotary element is essentially equal to the diameter of the drawing drum.

5. A device according to claim 1, wherein the support element of that end of the axis of the drawing drum that is opposite to the actuator device is provided with an element for moving the drawing drum axis.

* * * * *